United States Patent
Swartz et al.

(10) Patent No.: US 12,426,079 B2
(45) Date of Patent: Sep. 23, 2025

(54) PRIORITIZING NETWORK TRAFFIC FOR EMERGENCY SERVICES

(71) Applicant: Cisco Technology, Inc., San Jose, CA (US)

(72) Inventors: John Matthew Swartz, Lithia, FL (US); Jerome Henry, Pittsboro, NC (US); Robert Edgar Barton, Richmond (CA); Matthew Aaron Silverman, Shaker Heights, OH (US); Fred Jay Anderson, Lakeville, OH (US)

(73) Assignee: CISCO TECHNOLOGY, INC., San Jose, CA (US)

(*) Notice: Subject to any disclaimer, the term of this patent is extended or adjusted under 35 U.S.C. 154(b) by 338 days.

(21) Appl. No.: 18/173,149

(22) Filed: Feb. 23, 2023

(65) Prior Publication Data
US 2024/0292449 A1    Aug. 29, 2024

(51) Int. Cl.
*H04W 72/566*   (2023.01)
*H04W 4/90*     (2018.01)
*H04W 12/08*    (2021.01)
*H04W 12/60*    (2021.01)

(52) U.S. Cl.
CPC ........... *H04W 72/566* (2023.01); *H04W 4/90* (2018.02); *H04W 12/08* (2013.01); *H04W 12/66* (2021.01)

(58) Field of Classification Search
CPC ..... H04W 72/566; H04W 4/90; H04W 12/66; H04W 12/08
USPC ...................................................... 455/404.1
See application file for complete search history.

(56) References Cited

U.S. PATENT DOCUMENTS

| | | | | |
|---|---|---|---|---|
| 11,184,234 | B2* | 11/2021 | Mahdi | .................. H04L 41/16 |
| 2002/0129264 | A1* | 9/2002 | Rowland | ............. H04L 63/1441 |
| | | | | 709/224 |
| 2004/0249563 | A1* | 12/2004 | Otsuki | .................... H04Q 9/02 |
| | | | | 701/454 |

(Continued)

FOREIGN PATENT DOCUMENTS

| | | |
|---|---|---|
| WO | 2014009212 A1 | 1/2014 |
| WO | 2022082024 A1 | 4/2022 |

OTHER PUBLICATIONS

Federal Communications Commission, "Wireless Priority Service (WPS)," https://www.fcc.gov/general/wireless-priority-service-wps, retrieved from the Internet on Feb. 14, 2023, 3 pages.

(Continued)

*Primary Examiner* — Mark G. Pannell
(74) *Attorney, Agent, or Firm* — Edell, Shapiro & Finnan, LLC

(57) ABSTRACT

A method, computer system, and computer program product are provided for prioritizing network traffic. An indication is received at a network controller that an alarm is activated at a physical site. A request is received from a user device to join a network at the physical site that is under control of the network controller, wherein the request includes a flag indicating an identity of a user of the user device and a priority status of the user. In response to authenticating the identity of the user via an identity provider server, the user device is authorized to join the network. Based on verifying the priority status of the user using the flag and authentication via the identity provider server, network traffic for the user device is prioritized.

20 Claims, 6 Drawing Sheets

(56) References Cited

U.S. PATENT DOCUMENTS

| | | | |
|---|---|---|---|
| 2005/0066218 A1* | 3/2005 | Stachura | G06F 11/2041 |
| | | | 714/3 |
| 2007/0123208 A1 | 5/2007 | Batta et al. | |
| 2009/0054029 A1 | 2/2009 | Hogberg et al. | |
| 2009/0100492 A1* | 4/2009 | Hicks, III | H04N 21/6156 |
| | | | 725/127 |
| 2009/0322511 A1* | 12/2009 | McKenna | H04W 4/90 |
| | | | 340/539.11 |
| 2010/0255808 A1 | 10/2010 | Guo et al. | |
| 2011/0117874 A1* | 5/2011 | Shaw | H04W 76/50 |
| | | | 455/41.3 |
| 2012/0014332 A1* | 1/2012 | Smith | H04W 72/04 |
| | | | 370/329 |
| 2013/0109340 A1* | 5/2013 | Williams | H04M 3/5116 |
| | | | 455/466 |
| 2013/0145482 A1* | 6/2013 | Ricci | G01S 19/13 |
| | | | 726/28 |
| 2015/0040228 A1* | 2/2015 | Lee | H04L 63/1408 |
| | | | 726/25 |
| 2016/0381699 A1* | 12/2016 | Rubin | H04L 1/00 |
| | | | 370/329 |
| 2017/0180062 A1* | 6/2017 | Johansen | H04B 17/12 |
| 2018/0192264 A1 | 7/2018 | Kwok et al. | |
| 2019/0190942 A1* | 6/2019 | Drummond | H04K 3/226 |
| 2025/0048094 A1* | 2/2025 | Pourzandi | H04W 12/06 |

OTHER PUBLICATIONS

Subir Das, Peraton Labs, "Emergency Preparedness Communication Service (EPCS*): Background and Proposal," doc.: IEEE 802.11-22-0658/r0, https://mentor.ieee.org/802.11/dcn/22/11-22-0658-00-000m-lb258-cid-2319.pptx., Apr. 23, 2022, 12 pages.

* cited by examiner

PRIORITIZING NETWORK TRAFFIC FOR EMERGENCY SERVICES

TECHNICAL FIELD

The present disclosure relates generally to wireless networking, and more specifically, to prioritizing network traffic for emergency services during an emergency.

BACKGROUND

In many parts of the world, first responders and other emergency services (e.g., firefighters, police, medics, etc.) are provided access to protected cellular bands that are dedicated for usage by the first responders. For example, in the United States, FirstNet Band 14 is a protected cellular band that may only be used by emergency services. Protection of a cellular band plays a role where large crowds meet, such as in large venues, sports stadiums, concert halls, and the like. When an incident occurs that necessitates first responders to respond, the sheer volume of people using their cell phones often consumes all available channels, preventing the first responders from having any cellular access, thereby disrupting their ability to communicate at such a location during an emergency.

DETAILED DESCRIPTION

Overview

Figure 1:
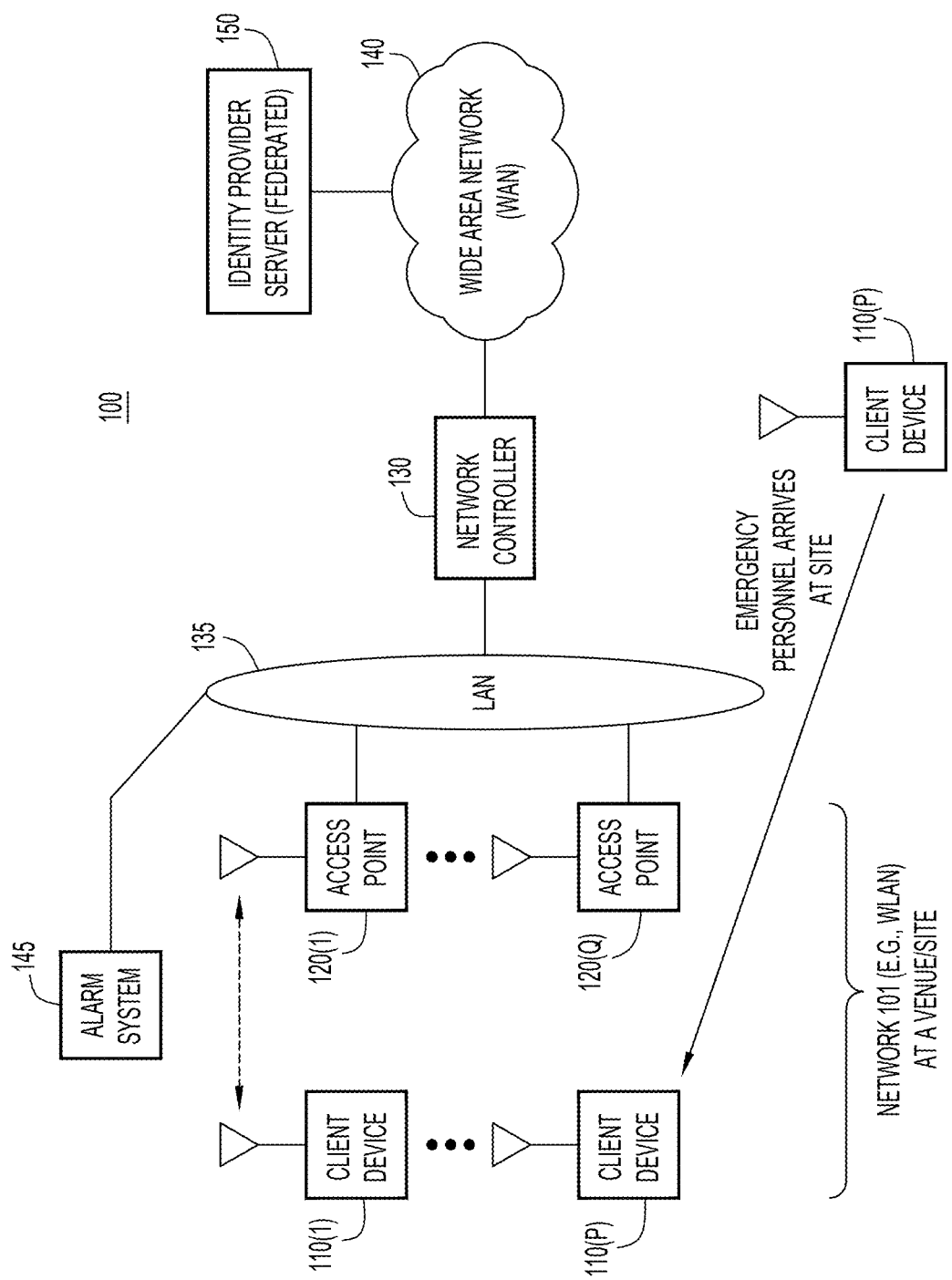
FIG. 1 is a block diagram of a networking environment in which network traffic for emergency services may be prioritized, according to an example embodiment.

According to one embodiment, techniques are provided for prioritizing network traffic. A network controller receives an indication that an alarm is activated at a physical site. A request is received from a user device to join a network at the physical site that is under control of the network controller. The request includes a flag indicating an identity of a user of the user device and a priority status of the user. In response to authenticating the identity of the user via an identity provider server, the user device is authorized to join the network. Based on verifying the priority status of the user using the flag and authentication via the identity provider server, network traffic for the user device is prioritized.

Example Embodiments

Present embodiments relate to wireless networking, and more specifically, to the prioritization of network traffic of certain devices for emergency services during an emergency.

During an emergency, first responders who arrive at a location may be unable to communicate with each other or other individuals using the location's wireless network because of the demand caused by other devices. For example, during an emergency, many individuals may attempt to communicate over the wireless network, leaving little bandwidth available for the first responders.

Present embodiments provide an approach to prioritizing the traffic of network devices belonging to first responders in a fully-automated manner that ensures that first responders can effectively communicate during an emergency or other event. In particular, this solution is described as fully-automated because a first responder does not need to manually join a wireless network or provide an identity to prove his or her first responder status. Rather, present embodiments enable user devices to seamlessly join a wireless network during an emergency using a federated identity provider.

A federated identity provider is an identity provider that provides a service that allows individuals to use their existing identity information from one organization (such as an email address or other identifier) to access resources provided by another organization. It acts as a central hub for authentication and authorization, providing a secure and seamless single sign-on (SSO) experience for users across multiple applications and services. The service leverages open standards such as Security Assertion Markup Language (SAML), Open Authorization (OAuth), and Open Identity Connect (OpenID Connect) to enable interoperability between identity providers and service providers (e.g., wireless local area networks). Thus, as the user goes from one service provider to another, the user's device can be automatically authenticated and provided with service without the user device requiring any pre-existing relationship with, or information about, the particular service provider. One example of a federated-based authentication platform is OpenRoaming. Network controllers, identity providers, access points, and other network equipment that are configured to participate in the federated-based authentication platform can exploit the cross-domain authentication capabilities afforded by the federated-based authentication platform.

Initially, a form of a federated identity provider is utilized to enable a first responder's device (e.g., a smartphone, etc.) join a wireless network in a fully-automated manner. In a federated identity management system, a service provider may authenticate a user by confirming the user's credentials with an identity provider (IdP). Present embodiments provide a flag that a user device transmits to a service provider in order to authenticate with an identity provider, and therefore to authenticate with the service provider, but to also indicate that the user device is associated with a first responder or other individual to whom heightened network traffic priority should be granted. Thus, when a user, such as a first responder, arrives at a location, the user's device can automatically join a wireless network and begin transmitting and/or receiving data at a higher priority than other devices on the wireless network. Prioritization of network traffic for certain user devices may occur in response to an alarm or other indicator of an emergency, so that a first responder's device may not receive higher network priority on the network at a location, unless there is an actual emergency at the location. Moreover, the role of a user can be indicated in the flag, so that certain first users are prioritized over others. For example, a supervisor may receive higher priority over other first responders, or a firefighter may be designated with a different priority than a medical responder.

Thus, present embodiments improve the technical fields of telecommunication and disaster recovery by prioritizing the network traffic of certain users (e.g., first responders) during an emergency or other event. Prioritizing first responders provides the practical application of ensuring that the first responders can coordinate during an emergency, thereby reducing casualties or minimizing injury to people, damage to property, and mitigating any other negative outcomes that can be posed by an emergency.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. Reference is now made to FIG. 1, which shows an example network environment 100 in which the techniques presented herein may be used. Network environment 100 includes a network 101 (such as a wireless local area network) that includes one or more client devices 110(1)-110(P) and one or more access points (APs) 120(1)-120(Q). A network controller 130 is connected to a local area network (LAN) 135 to which the APs 120(1)-120(Q) are connected, and the LAN 135 may be connected to wide area network ((WAN), e.g., the Internet) 140. There may be an alarm system 145 at the venue/site of the network 101 and the alarm system 145 may be connected to the LAN 135, or the alarm system 145 may be or include a wireless device that is part of the network 101. An identity provider server 150 (e.g., a federated identity provider (IdP)) is provided that is connected to the WAN 140 and thus able to communication with the network controller 130. The network controller 130 is also connected to the WAN 140. Identity provider server 150 may perform operations related to the authentication of user devices based on the identities of users indicated in flags received from those devices. The network 101, network controller 130, and identity provider server 150 all have connectivity to the WAN 140.

Alarm system 145 may include any system for monitoring a site and/or for receiving user input that indicates that a particular event has occurred. In various embodiments, alarm system 145 may include one or more actuated fire alarms, motion sensors, panic buttons, silent alarms, smoke detectors, carbon monoxide detectors, thermometers, or any other system or device for detecting a potential emergency or other event. In some embodiments, alarm system 145 may be manually triggered by a user based on physical user input or input from a user device (e.g., electronically activated via a user interacting with an application of a computing device). Thus, alarm system 145 may be configured to indicate an alarm upon automatically detecting any desired condition, and/or manually receiving input from a user (e.g., any user or a designated user such as an administrator, etc.). When an event, such as an emergency, is detected, alarm system 145 may notify network controller 130 via LAN 135.

Client device 110(P) may correspond to a user device of emergency personnel (e.g., a first responder or other individual designated as the recipient of higher-priority traffic) when alarm system 145 detects an event. As depicted, when the emergency personnel arrives at the site, client device 110(P) may automatically join network 101 by transmitting a flag that indicates the identity of the emergency personnel. This flag may be received by network controller 130 and used to authenticate the client device 110(P) via an authentication exchange with the identity provider server 150, at which point the client device 110(P) automatically joins network 101. The flag may correspond to a node of a Wi-Fi® Alliance (WFA) Per Subscriber Subscription Management Object (PPS MO).

Identity provider server 150 may be a server of a federated identity provider, which provides a service that authenticates user devices across a variety of third-party networks based on the identity of the user. In the depicted embodiment of FIG. 1, identity provider server 150 may receive a flag from a client device (e.g., any of client devices 110(1)-110(P)) that indicates an identity of a user of the device. The flag may be forwarded via network controller 130, which may perform an authentication handshake with identity provider server 150 in order to authenticate a device and subsequently admit that device to a network (e.g., network 101). Thus, identity provider server 150 may support a trusted federated identity protocol that enables devices to join networks in a manner that does not require any user involvement at the time of network join. For example, a user may not be required to manually select a join a supported network, but rather, the user's device may automatically be authenticated and join the network once the device is within wireless communication range.

While the figures and description herein refer to the client devices as wireless client devices and the access points as wireless access points, again this is not meant to limiting. The techniques presented herein are applicable to both wired and wireless client devices. In the case in which the client devices are wireless, e.g., Wi-Fi capable client devices, then the APs are wireless (e.g., Wi-Fi capable) APs, and the network controller 130 may be a wireless local area network (WLAN) controller (WLC). However, in the case in which the client device devices are wired devices, then the APs may be network switches to which the client devices connect by a network cable. Thus, the term "access point" or "AP" is not to be limited to a wireless access point device, and the term "client device" is not to be limited to a wireless (Wi-Fi capable) client device.

Figure 2:
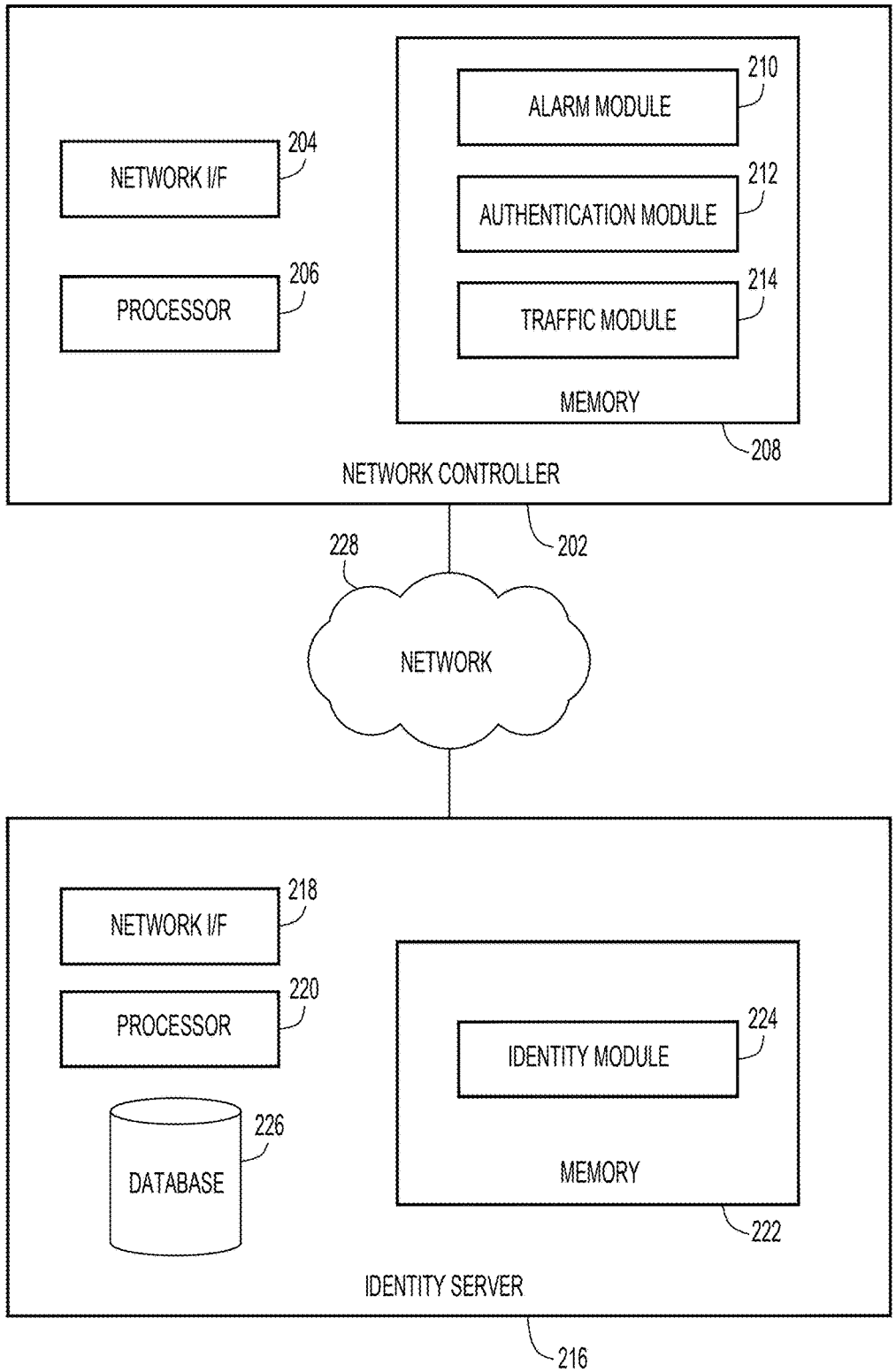
FIG. 2 is a block diagram of network elements that are configured for prioritizing network traffic, according to an example embodiment.

With reference now to FIG. 2, a block diagram is shown of network elements 200 configured for prioritizing network traffic, according to an example embodiment. As depicted, the network elements include a network controller 202 and an identity server 216 that are in communication via network 228. Network controller 202, identity server 216, and/or network 228 may correspond to network controller 130, identity provider server 150), and wide area network 140, respectively, as depicted and described with reference to FIG. 1. It is to be understood that the functional division among components have been chosen for purposes of explaining various embodiments and is not to be construed as a limiting example.

Network controller 202 includes a network interface (I/F) 204, at least one processor (computer processor) 206, and memory 208, which stores instructions for an alarm module 210, an authentication module 212, and a traffic module 214. In various embodiments, network controller 202 may include a rack-mounted server, laptop, desktop, smartphone, tablet, or any other programmable electronic device capable of executing computer readable program instructions. Network interface 204 enables components of network controller 202 to send and receive data over a network, such as network 228. In general, network controller 202 may perform operations relating to management of a network, including prioritizing network traffic of some devices over other devices by reserving and allocating bandwidth accordingly. The network controller 202 may also be entirely virtualized and running on one or more servers in a computing system/datacenter.

Alarm module 210, authentication module 212, and traffic module 214 may include one or more modules or units to perform various functions of the embodiments described below. Alarm module 210, authentication module 212, and traffic module 214 may be implemented by any combination of any quantity of software and/or hardware modules or units, and may reside within memory 208 of network controller 202 for execution by a processor, such as processor 206.

Alarm module 210 may monitor for an indication that an alarm has been triggered at a venue (e.g., by alarm system 145 in FIG. 1) whose network is managed by network controller 202. The alarm may indicate the occurrence of an emergency or other specified condition. In various embodiments, the alarm may be a manual alarm (e.g., fire alarm, panic button, etc.), an automatic alarm (e.g., a smoke detector alarm, a motion sensor alarm, etc.), and/or combinations thereof. In some embodiments, the alarm is software-actuated by a user, such as an administrator, via a client in communication with network controller 202. When an alarm is received, alarm module 210 may indicate the alarm status to traffic module 214. In some embodiments, alarm module 210 may detect two or more different types of alarms, and accordingly, alarm module 210 may indicate an alarm type to traffic module 214.

Authentication module 212 may implement a trusted federated identity protocol that authenticates devices onto a network managed by network controller 202 based on an identity that is transmitted by the devices. A device can transmit a flag indicating a particular identity (e.g., a specific user or set of users, etc.), and authentication module 212 may transmit a request to authenticate a device, using the identity, to a server of a federated identity provider (e.g., identity server 216). If the user is listed as an authorized user, then the server of the federated identity provider may indicate that the device may be authenticated to a network, and authentication module 212 may subsequently enable the device to join the network. In some embodiments, authentication module 212 authenticates with different federated identity providers based on data that is included in a device's flag.

Traffic module 214 may prioritize the traffic of certain network devices in response to receiving an indication of an alarm (e.g., from alarm module 210). In particular, traffic module 214 may identity any devices whose identity corresponds to a particular type of user or whose identity appears on a priority list, and may prioritize the traffic accordingly.

In some embodiments, traffic module identifies any devices that have successfully authenticated with a particular federated identity provider, and prioritizes those devices accordingly.

Network traffic of selected devices can be prioritized in a number of ways. In some embodiments, non-prioritized devices may be subject to a same data rate/bandwidth throttling, or disassociated entirely from a network. In some embodiments, the traffic of prioritized devices is only prioritized during times at which the relative bandwidth consumption of devices in a network compared to the capacity of the network exceeds a predetermined threshold. In some embodiments, different prioritized devices can be subject to different levels of prioritization based on the role of the user whose identity is attached to each device. For example, when first responders arrive at a site to attend to an emergency in response to an alarm, the network traffic associated with devices of police officers may be prioritized more or less than the traffic of devices belonging to firefighters. Moreover, the type of alarm may cause different devices to be prioritized differently. For example, if the alarm is a fire alarm, network traffic associated with firefighter devices may be prioritized over network traffic of other first responder devices, whereas if the alarm indicates a criminal act, the network traffic associated with devices of police officers may receive a highest priority. The role of a user (e.g., supervisor, chief, etc.) within a particular class of users (e.g., firefighters, emergency medical technicians, police officers, etc.) may determine how the device is prioritized, with higher-ranking officials typically receiving higher priority. In some embodiments, once prioritized, network traffic for a device may be permanently prioritized by a network controller (e.g., prioritized even after an emergency or other event has concluded).

Identity server 216 includes a network interface (I/F) 218, at least one processor 220, and memory 222, which stores instructions for an identity module 224. In various embodiments, identity server 216 may include a rack-mounted server, laptop, desktop, smartphone, tablet, or any other programmable electronic device capable of executing computer readable program instructions. Network interface 218 enables components of identity server 216 to send and receive data over a network, such as network 228. In general, identity server 216 may serve as an identity provider that utilizes a trusted federated identity protocol to authenticate user devices to grant access to other networks. Identity server 216 may be selected by network controller 202 out of a plurality of choices of identity servers in order to authenticate a particular user device. In some embodiments, the particular identity server (e.g., identity server 216) may be indicated by data that is provided in a flag of the user device.

Identity module 224 may include one or more modules or units to perform various functions of the embodiments described below. Identity module 224 may be implemented by any combination of any quantity of software and/or hardware modules or units, and may reside within memory 222 of identity server 216 for execution by a processor, such as processor 220.

Identity module 224 may authenticate user devices onto networks (e.g., local area networks, wireless local area networks) using a trusted federated identity protocol in which an identity is obtained from a user device by a network controller, which then provides the identity to identity module 224 for verification. Once verified, identity module 224 may acknowledge the verification to network controller 202, which then permits the user device to join the network. Any trusted federated identity protocol may be employed. In some embodiments, the protocol is a cryptographic protocol. Identity module 224 may authenticate a user device by evaluating the obtained identity against a list of approved identities.

Database 226 may include any non-volatile storage media known in the art. For example, database 226 can be implemented with a tape library, optical library, one or more independent hard disk drives, or multiple hard disk drives in a redundant array of independent disks (RAID). Similarly, data in database 226 may conform to any suitable storage architecture known in the art, such as a file, a relational database, an object-oriented database, and/or one or more tables. Database 226 may store any data that is relevant to authenticating users via a trusted federated identity service, such as a listing of approved user identities.

Network 228 may include a local area network (LAN), a wide area network (WAN) such as the Internet, or a combination of the two, and includes wired, wireless, or fiber optic connections. In general, network 228 can be any combination of connections and protocols known in the art that will support communications between network controller 202 and identity server 216 via their respective network interfaces in accordance with the described embodiments.

Figure 3:
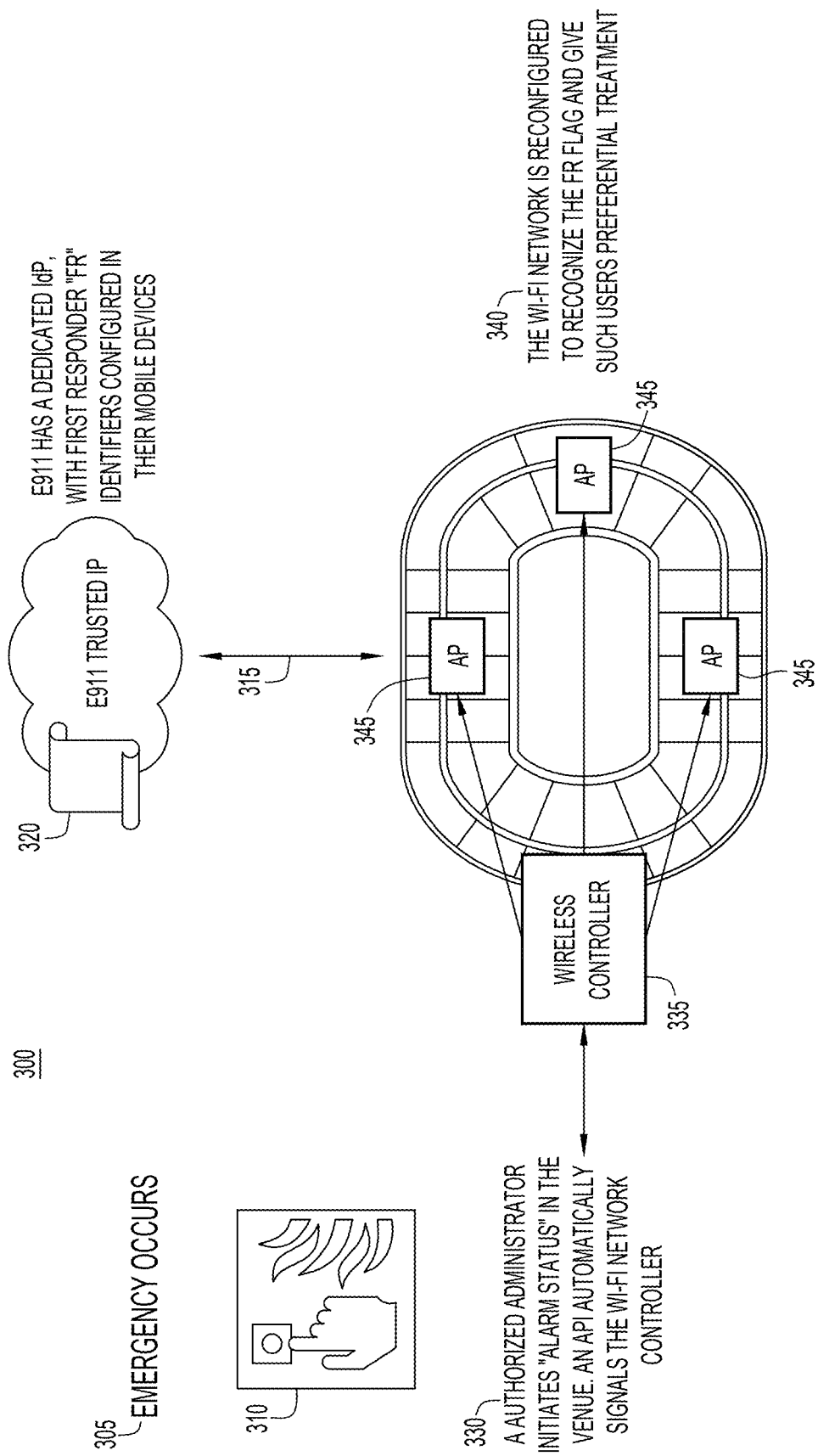
FIG. 3 is a diagram of an operational flow for prioritizing network traffic, according to an example embodiment.

Turning now to FIG. 3, a diagram of an operational flow 300 for prioritizing network traffic is depicted, according to an example embodiment. Beginning at operation 305, an emergency occurs at a venue. Alarms, such as alarm 310, may be activated, and a wireless controller (e.g., wireless controller 335) may be informed. In some embodiments, the wireless controller is informed using an Application Programming Interface (API) that enables an alarm to communicate with the wireless controller.

As indicated by arrow 315, the venue has a trusted relationship with one or more particular identity provider servers (e.g., "E911 Trusted IdP 320"). In the depicted example, the identity provider may be associated with an "emergency 911" service that can dispatch police, emergency medical technicians, firefighters, and the like. As indicated, E911 Trusted IdP 320 is an identity provider that is dedicated to emergency services, and the first responder' identities are configured in their mobile devices.

At operation 330, an administrator reacts to the alarm by initiating an alarm status for the venue. Through an API, the administrator may inform wireless controller 335 that an alarm has been initiated. In some embodiments, alarm 310 may include a network interface that enables alarm 310 to directly notify wireless controller 335 (e.g., via an API) when alarm 310 is activated. Wireless controller 335 may respond to prioritize devices of the first responds, and at operation 340, the Wi-Fi network is reconfigured to recognize first responder (FR) flags in previously-authenticated user devices and/or user devices that will be authenticated in the future, thus giving the user devices preferential treatment when communicating with access points 345 during the emergency.

Figure 4:
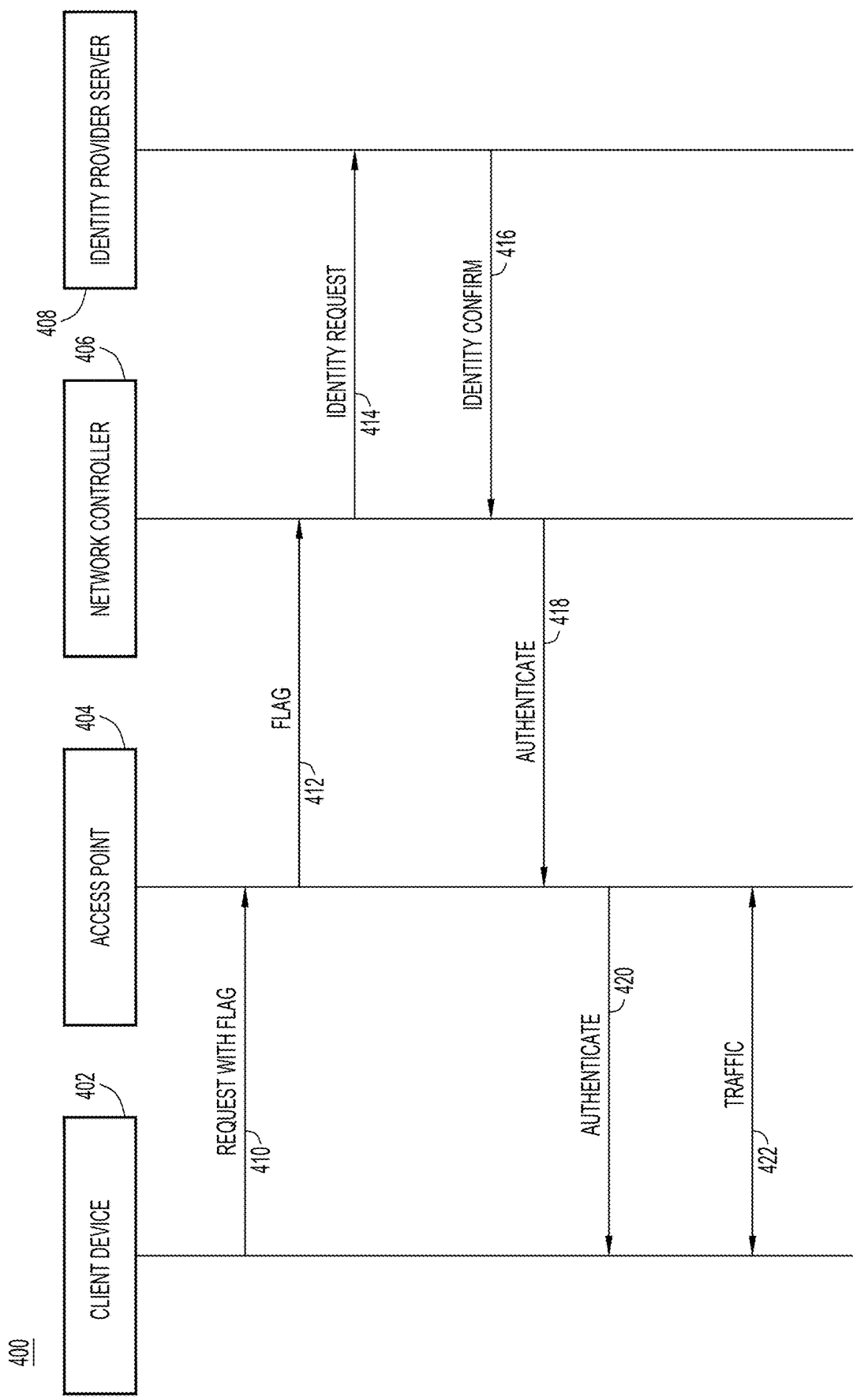
FIG. 4 is a sequence diagram of a process to authenticate a device for prioritizing network traffic for that device, according to an example embodiment.

FIG. 4 is a sequence diagram of a process 400 to authenticate a device for prioritizing network traffic, according to an example embodiment. As depicted, data is exchanged between a client device 402, access point 404, network controller 406, and identity provider server 408, which may correspond to client device 110(P), access points 120(1)-120(Q), network controller 130, and/or identity provider server 150, respectively, as depicted and described with reference to FIG. 1.

At operation 410, client device 402 transmits a request to join a network that includes a flag to access point 404. Client device 402 may automatically (e.g., without user input) transmit the request upon detecting a Service Set Identifier (SSID) of the network by access point 404. The flag may include an identity of the user of client device 402, which can indicate that the user is a first responder, as well as the type of first responder (e.g., paramedic, firefighter, etc.) and/or role (e.g., supervisor, etc.).

At operation 412, access point 404 forwards flag data to network controller 406, which then forwards the flag data to identity provider server 408 at operation at operation 414 in the form of a request to confirm the user's identity.

Identity provider server 408 may then confirm the user's identity based on data from the flag. At operation 416, identity provider server 408 informs network controller 406 that the identity is confirmed to be authenticated, and at operation 418, network controller 406 forwards the authentication to access point 404, which authenticates client device 402 at operation 420. Access point 404 may store client device 402 in a Wireless LAN controller (WLC) user entry of access point 404.

Once authenticated, client device 402 may begin to exchange communications (operation 422) with access point 404, which can provide access to other devices in a network, such as a local area network or wide area network. Based on how client device 402 is authenticated, client device 402 may receive prioritized traffic as compared to other devices connected to access point 404 or other access points of the network.

Figure 5:
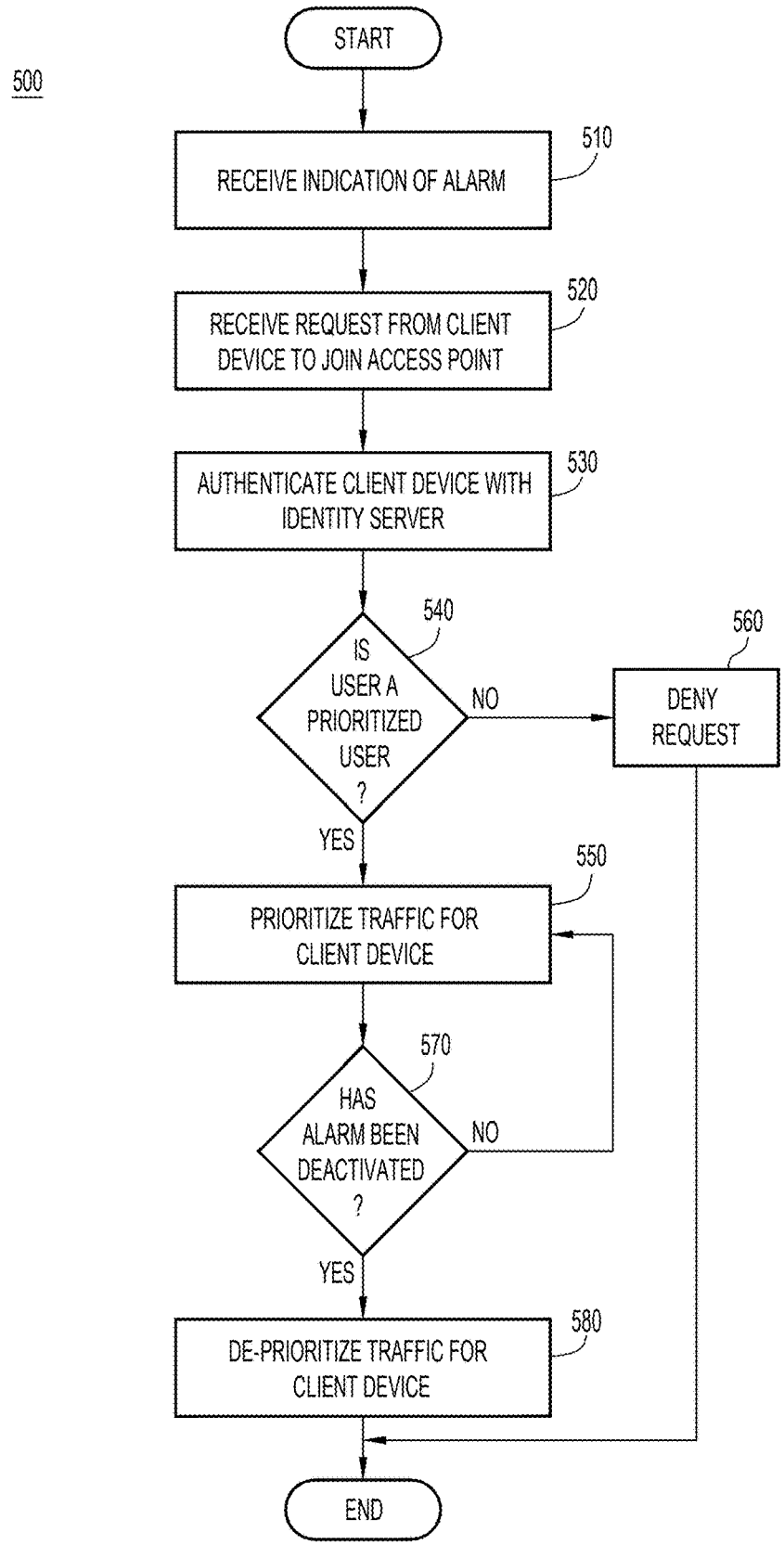
FIG. 5 is a flow chart of a method of prioritizing network traffic, according to an example embodiment.

FIG. 5 is a flow chart of a method 500 of prioritizing network traffic, according to an example embodiment.

An indication of an alarm is received at operation 510. The alarm may include any conventional or other alarm, including automatic and/or manually-actuated alarms, such as smoke detectors, motion detections, hand-pulled fire alarms, panic buttons, and the like. The indication of the alarm may be received by a network controller of a network, which is responsible for managing, inter alia, traffic of various devices that may be connected via one or more access points. Once an alarm has been triggered, a network controller may be configured to identity and prioritize the traffic of certain client devices over other client devices. In some embodiments, there are various levels of an alarm (e.g., levels of severity).

A request is received from a client device to join an access point at operation 520. The client device may automatically request to join the network via a federated identity protocol. The request may be received initially by an access point, which forwards the request to a network controller. The network controller may then select a particular identity server, such as an emergency services identity server, based on identity data received from the requesting client device.

The client device is authenticated with an identity server at operation 530. The network controller may transmit a request to the identity server, which includes data providing the identity of a user of the client device. The identity server can then confirm that the user is authenticated in a response to the network controller. Operation 540 determines whether the user is a prioritized user. During the authentication process, the identity server may confirm that the user is designated as a prioritized user or not, and as such, the traffic of the user's client device can be handled accordingly. A list of prioritized users may be consulted using the user's identity to make the determination of operation 540.

If the user is a prioritized user, then traffic for client devices is prioritized at operation 550. The user's traffic may be prioritized according to any quality-of-service implementation or other approach. In some embodiments, a particular SSID may be broadcast by one or more access points that the client device joins, and any traffic using that SSID may be prioritized. For example, a Baggage Transfer Message (BTM) or similar message can be provided to a prioritized device to cause the device to switch over to the designated SSID. A client device may be prioritized differently according to the type of user (e.g., paramedic vs. firefighter, etc.), the role of the user (e.g., supervisory role), the type of the alarm (e.g., fire alarm vs. medical alert), the severity level of the alarm, and/or other factors. In some embodiments, non-prioritized devices may have their traffic throttled, or non-prioritized devices may be disassociated from an access point. In various embodiments, a client device may be prioritized by allocating bandwidth accordingly, adjusting the channel utilization percentage (CU %), changing an AirTime Fairness configuration, remarking traffic to specific Access Categories (AC)/Differentiated services code point (DSCP) values, and the like. In some embodiments, devices are prioritized using an existing or modified Emergency Preparedness Communication Service (EPCS) protocol. The access point may enforce a particular ratio of emergency traffic to normal traffic to ensure that non-prioritized traffic is still permitted.

If the user is not a prioritized user, then the request is denied at operation 560. In some embodiments, the client device may still be permitted to join a network, but the client device's traffic will not be prioritized. In other embodiments, the client device may be prevented from joining a network. In some embodiments, client devices are not prioritized by an access point by adjusting a Target Wake Time (TWT) value for the devices to request that non-prioritized devices enter a silent mode.

Operation 570 determines whether the alarm has been deactivated. A prioritized client device may experience prioritized network traffic until the alarm has been deactivated. If deactivated, traffic for the any previously-prioritized client device may be de-prioritized at operation 580. If the alarm has not been deactivated, then a client device may remain prioritized at operation 550.

Figure 6:
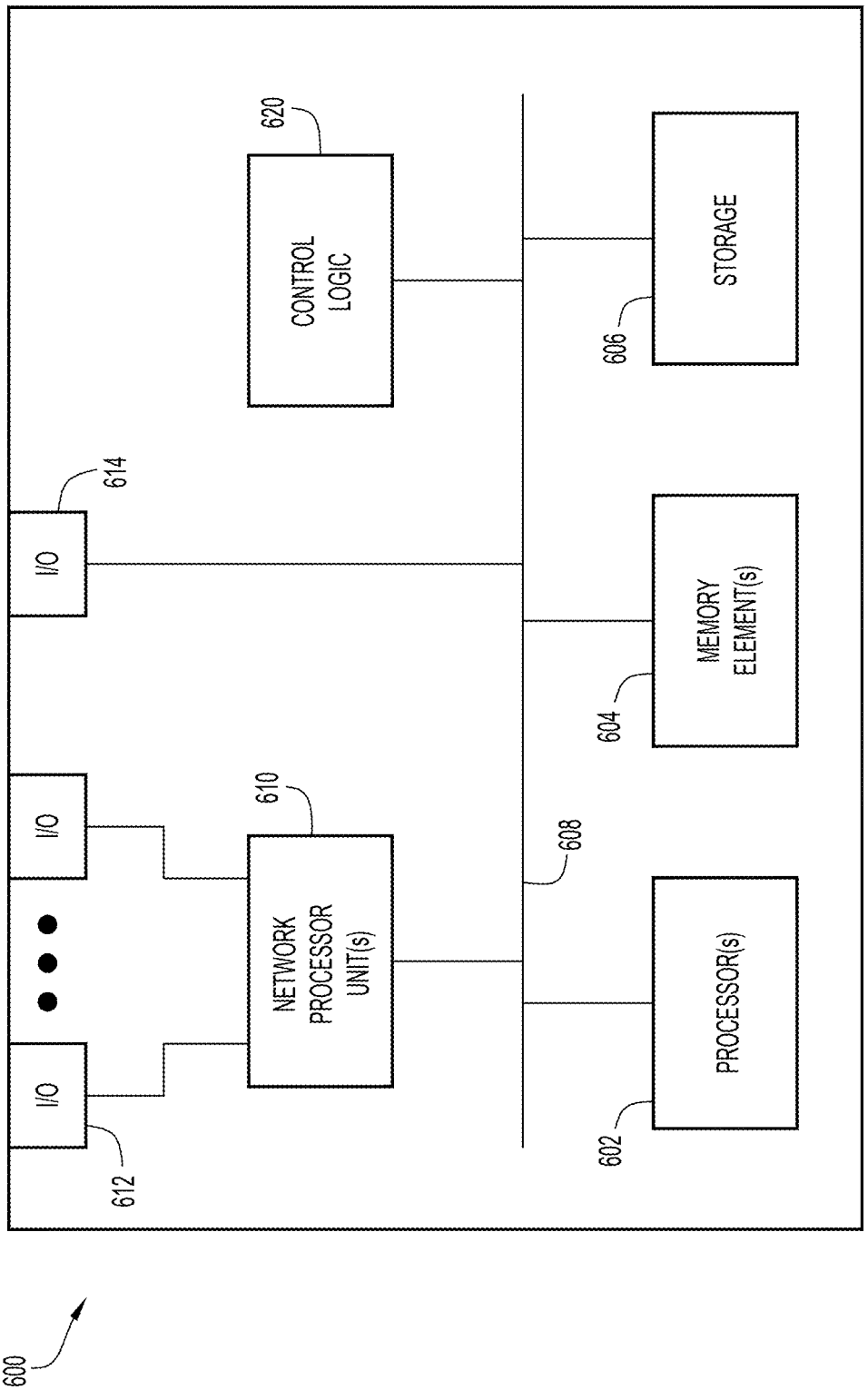
FIG. 6 is a block diagram of a device that may be configured to perform operations to enable prioritizing of network traffic, as presented herein.

Referring now to FIG. 6, FIG. 6 illustrates a hardware block diagram of a computing device 600 that may perform functions associated with operations discussed herein in connection with the techniques depicted in FIGS. 1-5. In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O 614, and 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O 614 allow for input and output of data and/or information with other entities that may be connected to computing device 600. For example, I/O 614 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: receiving, at a network controller, an indication that an alarm is activated at a physical site; receiving, from a user device, a request to join a network at the physical site that is under control of the network controller, wherein the request includes a flag indicating an identity of a user of the user device and a priority status of the user; in response to authenticating the identity of the user via an identity provider server, authorizing the user device to join the network; and based on verifying the priority status of the user using the flag and authentication via the identity provider server, prioritizing network traffic for the user device.

In some aspects, the techniques described herein relate to a method, wherein the network is a wireless local area network, and wherein the authenticating is established using a trusted federated identity protocol that is also used to establish trust between the network controller and the identity provider server.

In some aspects, the techniques described herein relate to a method, wherein the indication of the alarm specifies an alarm type, and wherein prioritizing the network traffic of the user device is based on the alarm type.

In some aspects, the techniques described herein relate to a method, wherein the flag indicates a first responder status of the user, and wherein prioritizing the network traffic of the user device is based on the first responder status.

In some aspects, the techniques described herein relate to a method, wherein prioritizing the network traffic for the user device includes assigning preferential treatment of available bandwidth in the network relative to other network traffic of other devices operating on the network.

In some aspects, the techniques described herein relate to a method, wherein the prioritizing the network traffic includes assigning lower priority to use of the network for network traffic of unprioritized network devices, and disassociating unprioritized network devices from the network.

In some aspects, the techniques described herein relate to a method, further including terminating prioritizing of network traffic for the user device in response to receiving an indication that the alarm has been disabled.

In some aspects, the techniques described herein relate to a method, wherein one or more access points of the network broadcast an emergency Service Set Identifier through which the user device joins the network, and wherein traffic of the emergency Service Set Identifier is prioritized over traffic in the network that utilizes another Service Set Identifier.

In some aspects, the techniques described herein relate to a method, wherein the network traffic for the user device is permanently prioritized by the network controller in response to verifying the priority status of the user and authenticating via the identity provider server.

In some aspects, the techniques described herein relate to a network controller (in the for of a computer system) including: one or more computer processors; one or more computer readable storage media; and program instructions stored on the one or more computer readable storage media for execution by at least one of the one or more computer processors, the program instructions including instructions to: receive, at a network controller, an indication that an alarm is activated at a physical site; receive, from a user device, a request to join a network at the physical site that is under control of the network controller, wherein the request includes a flag indicating an identity of a user of the user device and a priority status of the user; in response to authenticating the identity of the user via an identity provider server, authorize the user device to join the network; and based on verifying the priority status of the user using the flag and authentication via the identity provider server, prioritize network traffic for the user device.

In some aspects, the techniques described herein relate to a network controller, wherein the network is a wireless local area network, and wherein the authenticating is established using a trusted federated identity protocol that is also used to establish trust between the network controller and the identity provider server.

In some aspects, the techniques described herein relate to a network controller, wherein the indication of the alarm specifies an alarm type, and wherein prioritizing the network traffic of the user device is based on the alarm type.

In some aspects, the techniques described herein relate to a network controller, wherein the flag indicates a first responder status of the user, and wherein prioritizing the network traffic of the user device is based on the first responder status.

In some aspects, the techniques described herein relate to a network controller, wherein prioritizing the network traffic for the user device includes assigning preferential treatment of available bandwidth in the network relative to other network traffic of other devices operating on the network.

In some aspects, the techniques described herein relate to a network controller, wherein the prioritizing the network traffic includes assigning lower priority to use of the network for network traffic of unprioritized network devices, and disassociating unprioritized network devices from the network.

In some aspects, the techniques described herein relate to one or more non-transitory computer readable storage media collectively having program instructions embodied therewith, the program instructions executable by a computer to cause the computer to perform operations including: receive, at a network controller, an indication that an alarm is activated at a physical site; receive, from a user device, a request to join a network at the physical site that is under control of the network controller, wherein the request includes a flag indicating an identity of a user of the user device and a priority status of the user; in response to authenticating the identity of the user via an identity provider server, authorize the user device to join the network; and based on verifying the priority status of the user using the flag and authentication via the identity provider server, prioritize network traffic for the user device.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving, at a network controller, an indication that an alarm is activated at a physical site;
receiving, from a user device, a request to join a network at the physical site that is under control of the network controller, wherein the request includes a flag indicating an identity of a user of the user device and a priority status of the user;
in response to authenticating the identity of the user via an identity provider server, authorizing the user device to join the network; and
based on verifying the priority status of the user using the flag and authentication via the identity provider server, prioritizing network traffic for the user device.

2. The method of claim 1, wherein the network is a wireless local area network, and wherein the authenticating is established using a trusted federated identity protocol that is also used to establish trust between the network controller and the identity provider server.

3. The method of claim 1, wherein the indication of the alarm specifies an alarm type, and wherein prioritizing the network traffic of the user device is based on the alarm type.

4. The method of claim 1, wherein the flag indicates a first responder status of the user, and wherein prioritizing the network traffic of the user device is based on the first responder status.

5. The method of claim 1, wherein prioritizing the network traffic for the user device includes assigning preferential treatment of available bandwidth in the network relative to other network traffic of other devices operating on the network.

6. The method of claim 1, wherein the prioritizing the network traffic includes assigning lower priority to use of the network for network traffic of unprioritized network devices, and disassociating unprioritized network devices from the network.

7. The method of claim 1, further comprising terminating prioritizing of network traffic for the user device in response to receiving an indication that the alarm has been disabled.

8. The method of claim 1, wherein one or more access points of the network broadcast an emergency Service Set Identifier through which the user device joins the network, and wherein traffic of the emergency Service Set Identifier is prioritized over traffic in the network that utilizes another Service Set Identifier.

9. The method of claim 1, wherein the network traffic for the user device is permanently prioritized by the network controller in response to verifying the priority status of the user and authenticating via the identity provider server.

10. A network controller comprising:
one or more computer processors;
one or more computer readable storage media; and
program instructions stored on the one or more computer readable storage media for execution by at least one of the one or more computer processors, the program instructions comprising instructions to:
receive an indication that an alarm is activated at a physical site;
receive, from a user device, a request to join a network at the physical site that is under control of the network controller, wherein the request includes a flag indicating an identity of a user of the user device and a priority status of the user;
in response to authenticating the identity of the user via an identity provider server, authorize the user device to join the network; and
based on verifying the priority status of the user using the flag and authentication via the identity provider server, prioritize network traffic for the user device.

11. The network controller of claim 10, wherein the network is a wireless local area network, and wherein the authenticating is established using a trusted federated identity protocol that is also used to establish trust between the network controller and the identity provider server.

12. The network controller of claim 10, wherein the indication of the alarm specifies an alarm type, and wherein the program instructions that prioritize the network traffic of the user device are configured to prioritize the network traffic of the user device based on the alarm type.

13. The network controller of claim 10, wherein the flag indicates a first responder status of the user, and wherein the program instructions that prioritize the network traffic of the user device are configured to prioritize the network traffic of the user device based on the first responder status.

14. The network controller of claim 10, wherein the program instructions that prioritize the network traffic for the user device include one or more program instructions for assigning preferential treatment of available bandwidth in the network relative to other network traffic of other devices operating on the network.

15. The network controller of claim 10, wherein the one or more program instructions that are configured to prioritize the network traffic of the user device that prioritize the network traffic include one or more program instructions for assigning lower priority to use of the network for network traffic of unprioritized network devices, and disassociating unprioritized network devices from the network.

16. One or more non-transitory computer readable storage media having program instructions embodied therewith, the program instructions executable by a computer to cause the computer to perform operations including:
  receiving, at a network controller, an indication that an alarm is activated at a physical site;
  receiving, from a user device, a request to join a network at the physical site that is under control of the network controller, wherein the request includes a flag indicating an identity of a user of the user device and a priority status of the user;
  in response to authenticating the identity of the user via an identity provider server, authorizing the user device to join the network; and
  based on verifying the priority status of the user using the flag and authentication via the identity provider server, prioritizing network traffic for the user device.

17. The one or more non-transitory computer readable storage media of claim 16, wherein the network is a wireless local area network, and wherein the authenticating is established using a trusted federated identity protocol that is also used to establish trust between the network controller and the identity provider server.

18. The one or more non-transitory computer readable storage media of claim 16, wherein the indication of the alarm specifies an alarm type, and wherein prioritizing the network traffic of the user device is based on the alarm type.

19. The one or more non-transitory computer readable storage media of claim 16, wherein the flag indicates a first responder status of the user, and wherein prioritizing the network traffic of the user device is based on the first responder status.

20. The one or more non-transitory computer readable storage media of claim 16, wherein prioritizing the network traffic for the user device includes assigning preferential treatment of available bandwidth in the network relative to other network traffic of other devices operating on the network.

* * * * *